US010044387B1

(12) United States Patent
Gorin et al.

(10) Patent No.: US 10,044,387 B1
(45) Date of Patent: Aug. 7, 2018

(54) SYSTEMS AND METHODS FOR REMOVING IMAGES AND SPURS FROM MEASURED RADIO FREQUENCY (RF) SIGNALS

(71) Applicant: Keysight Technologies, Inc., Minneapolis, MN (US)

(72) Inventors: Joseph M. Gorin, Santa Rosa, CA (US); Gordon Strachan, Santa Rosa, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 15/607,002

(22) Filed: May 26, 2017

(51) Int. Cl.
  H04B 17/00 (2015.01)
  H04B 1/10 (2006.01)
  G06F 17/18 (2006.01)
  H04B 17/23 (2015.01)
  H04B 17/336 (2015.01)
  H04B 1/00 (2006.01)

(52) U.S. Cl.
  CPC .......... H04B 1/1027 (2013.01); G06F 17/18 (2013.01); H04B 1/0085 (2013.01); H04B 17/23 (2015.01); H04B 17/336 (2015.01)

(58) Field of Classification Search
  CPC ...... H04B 1/1027; H04B 1/525; H04B 17/23; H04B 17/336; H04B 1/0085; H04W 16/14; H04W 28/04; H04W 24/00
  USPC .................................. 455/63.1, 67.13, 226.3
  See application file for complete search history.

(56) References Cited

U.S. PATENT DOCUMENTS

| 7,024,172 B1* | 4/2006 | Murphy | H04B 1/30 455/313 |
| 8,145,165 B1* | 3/2012 | Su | H03G 3/3052 455/232.1 |
| 2005/0261880 A1 | 11/2005 | Gorin | |
| 2009/0221255 A1* | 9/2009 | Ma | H04B 1/30 455/305 |
| 2013/0095776 A1* | 4/2013 | Kavousian | H04B 1/109 455/114.3 |
| 2014/0194076 A1* | 7/2014 | Hwang | H04B 15/00 455/77 |

OTHER PUBLICATIONS

Agilent Technologies, Inc., "Achieving Excellent Spectrum Analysis Results Using Innovative Noise, Image and Spur-Suppression Techniques", Feb. 27, 2014, 5991-4039EN, 13 pages.
"Using Noise Floor Extension in the PXA Signal Analyzer", Agilent Technologies, 2010, pp. 1-16.

\* cited by examiner

*Primary Examiner* — Nhan Le (57) ABSTRACT

Measurement systems and methods are provided for performing preselection to remove images and spurs from a signal being measured that automatically determines a threshold value that is used in the preselection algorithm. Using the automatically-determined threshold value in the preselection algorithm improves image and spur removal from the final trace that is displayed on the display device of the measurement system by trading off the risk of images or spurs being contained in the final trace against the average level of noise bias.

19 Claims, 5 Drawing Sheets

FIG. 5

# SYSTEMS AND METHODS FOR REMOVING IMAGES AND SPURS FROM MEASURED RADIO FREQUENCY (RF) SIGNALS

BACKGROUND

Measurement systems such as signal analyzers and spectrum analyzers are used in a variety of applications to measure various types of signals under various types of conditions. In aerospace and defense applications, the task of signal measurement may be used to search for known or unknown signals across a broad frequency spectrum. In wireless communications, there is a need to characterize increasingly complex devices in an ever-increasing number of conditions and device states as quickly as possible. In all cases, searching for signal images and spurs requires instrumentation that can locate low-level signals at unknown frequencies across a wide frequency range. Making such measurements requires a spectrum analyzer or a signal analyzer (referred to collectively hereinafter as a "signal analyzer") that can perform high-speed measurements with a low noise floor, minimal spurs and images, and high dynamic range.

Signal analyzers generally fall into two broad categories, namely, preselected signal analyzers and non-preselected signal analyzers. A preselected signal analyzer has preselection circuitry that performs a preselection algorithm that removes images and spurs from an intended radio frequency (RF) signal that is being measured. A typical preselected signal analyzer may not, however, be fast enough for high-speed, high-resolution measurements. In non-preselected signal analyzers, the preselection algorithm is performed in software, and thus the preselection circuitry is eliminated. By eliminating the preselection circuitry and performing the preselection algorithm in software, non-preselected signal analyzers can provide advantages in terms of speed, accuracy and noise floor compared to preselected signal analyzers. However, the preselection algorithm that is implemented in software in a non-preselected signal analyzer must be sufficiently robust to remove unwanted images and spurious mixer products.

The preselection algorithm that is performed in software typically involves, in its simplest form: sweeping or stepping a frequency of a local oscillator (LO) of the signal analyzer through a first frequency range that has a lowest frequency that is less than the frequency of the intended RF signal to be measured (low-side mix) and that includes the frequency of an intended RF signal; measuring the input RF signal to obtain a reference trace; shifting the frequency range of the LO higher by twice the intermediate frequency (IF) to a second frequency range (high-side mix); sweeping or stepping the frequency of the LO through the second frequency range and again measuring the input RF signal to obtain an alternate trace; performing a mathematical operation that processes the reference trace and the alternate trace to remove any images from the measured RF signal; and displaying the final trace from which images have been removed.

The operation that processes the reference trace and the alternate trace to remove any images from the measured RF signal is typically referred to as a min-select operation. In general, where the reference trace and the alternate trace agree with one another, the response is real and where they disagree with one another, the disagreement is an image that should be rejected. Because images only add to the response, the images can be removed by comparing the minimum values of the reference trace and the alternate trace at each point, or frequency increment, and selecting the minimum of the two values as the value to be used in the final trace that is displayed.

The disadvantage of the preselection algorithm described above is that using the minimum of the two values introduces a bias in the final signal for cases where the input signal being measured is a noise-like signal. In essence, the min-select operation will affect the statistics of the measured noise and bias the measurement results. One solution to reduce the negative bias is to average each of the alternate traces over time before performing the min-select operation. This solution reduces, but does not eliminate, the bias.

One known solution for eliminating the bias, which is not entirely effective, is to use a user-selected, threshold value during the min-select operation. With this approach, the minimum values of the reference trace and the alternate trace at each point, or frequency increment, are compared and the minimum of the two values is then compared to the user-selected threshold value. If the minimum value is above the threshold value, then the minimum value is used in the final trace that is displayed; otherwise the reference trace value is used in the final trace.

A disadvantage of this solution is that the selection of the threshold value is left up to the user, who typically does not know how to select a suitable threshold value. If the threshold value is set too high, images at lower decibel levels will fail to be rejected. If the threshold value is set too low, some of the traces will have sufficient variability that the bias problem will not be eliminated.

A need exists for a non-preselected signal analyzer that is capable of performing the preselection algorithm in a manner that eliminates the aforementioned bias problem and that is robust, accurate and capable of being performed at high speed to meet the needs in the industry for measuring high-speed signals.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Representative embodiment disclosed herein are directed to measurement systems and methods for performing a preselection algorithm that automatically determines a threshold (TH) value and uses the TH value in the preselection algorithm. Using the automatically-determined TH value in the preselection algorithm improves image and spur removal by trading off the risk of images or spurs being contained in the final trace against the average level of noise bias.

In the following detailed description, for purposes of explanation and not limitation, example embodiments disclosing specific details are set forth in order to provide a thorough understanding of an embodiment according to the present teachings. However, it will be apparent to one having ordinary skill in the art having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms "a," "an," and "the" include both singular and plural referents, unless the context clearly dictates otherwise. Thus, for example, "a device" includes one device and plural devices.

Relative terms may be used to describe the various elements' relationships to one another, as illustrated in the accompanying drawings. These relative terms are intended to encompass different orientations of the device and/or elements in addition to the orientation depicted in the drawings.

It will be understood that when an element is referred to as being "connected to" or "coupled to" or "electrically coupled to" another element, it can be directly connected or coupled, or intervening elements may be present.

The term "memory" or "memory device", as those terms are used herein, are intended to denote a computer-readable storage medium that is capable of storing computer instructions, or computer code, for execution by one or more processors. References herein to "memory" or "memory device" should be interpreted as one or more memories or memory devices. The memory may, for example, be multiple memories within the same computer system. The memory may also be multiple memories distributed amongst multiple computer systems or computing devices.

A "processor," as that term is used herein encompasses an electronic component that is able to execute a computer program or executable computer instructions. References herein to a system comprising "a processor" should be interpreted as a system having one or more processors or processing cores. The processor may for instance be a multi-core processor. A processor may also refer to a collection of processors within a single computer system or distributed amongst multiple computer systems. The term "computer," as that term is used herein, should be interpreted as possibly referring to a single computer or computing device or to a collection or network of computers or computing devices, each comprising a processor or processors. Instructions of a computer program can be performed by a single computer or processor or by multiple processors that may be within the same computer or that may be distributed across multiple computers.

The term "noise-like signal," as that term is used herein, is a signal having a probability density of amplitude envelope that, when observed on a voltage scale of a signal analyzer with resolution bandwidth in use, is a Rayleigh distribution, which is a continuous probability distribution for positive-valued random variables.

According to various embodiments, methods are provided for removing images and spurs from measured RF signals. For example, a method includes automatically determining a TH value; taking a first measurement of an input RF signal received at an input port of the measurement instrument while sweeping an LO of the measurement instrument through a first predetermined frequency range subdivided into N frequency increments to obtain a reference trace comprising N reference trace elements, respectively, where N is a positive integer that is greater than or equal to one; taking M additional measurements of the input RF signal while sweeping the LO of the measurement instrument through M predetermined frequency ranges, respectively, to obtain M alternate traces, respectively, where M is a positive integer that is greater than or equal to one, each of the M frequency ranges being subdivided into N frequency increments, each of the M alternate traces comprising N alternate trace elements; of the M alternate traces, determining a minimum alternate trace, the minimum alternate trace comprising N minimum alternate trace elements; for each of the N minimum alternate trace elements, calculating N qualifier trace elements by taking an absolute value of a decibel difference between the N reference trace elements and the N minimum alternate trace elements, respectively, the N qualifier trace elements comprising a qualifier trace; comparing each qualifier trace element to the TH value, and when the qualifier trace element is greater than or equal to the TH value, using a minimum of the respective reference trace element and the respective alternate trace element as a respective final trace element of a final trace comprising N final trace elements, and when the qualifier trace element is less than the TH value, using the respective reference trace element as the respective final trace element in the final trace; and displaying the final trace.

Figure 1:
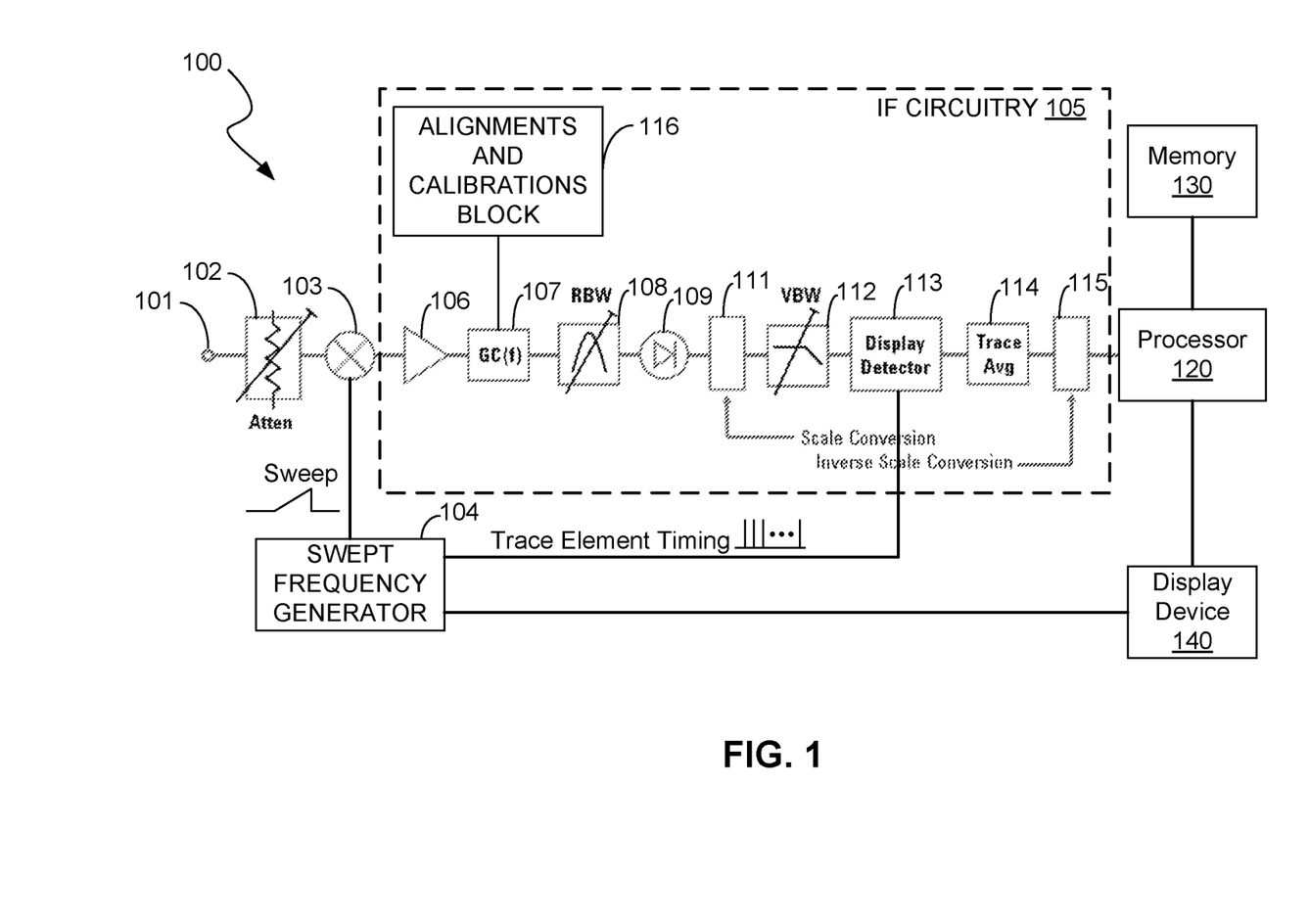
FIG. 1 is a schematic block diagram of a measurement system in accordance with a representative embodiment.

FIG. 1 illustrates a block diagram of a measurement system 100 in accordance with a representative embodiment that may be, for example, a signal analyzer. In accordance with this representative embodiment, the measurement system 100 is a non-preselected signal analyzer having a processor 120 that is configured to execute a preselection software computer program, as will be described below in more detail. Thus, in accordance with this representative embodiment, the measurement system 100 does not include the aforementioned preselection circuitry typically found in a preselected signal analyzer. As indicated above, eliminating the preselection circuitry and performing the preselection process in software can provide advantages in terms of speed, accuracy and noise floor compared to preselected signal analyzers. The measurement system 100 benefits from these advantages.

Additionally, the measurement system 100 automatically determines the proper TH value to be used during the preselection process, thereby improving image and spur removal. It should be noted, however, that the preselection algorithm described herein could be performed in hardware or in a combination of hardware and software and/or firmware, as will be understood by those of skill in the art in view of the description provided herein. It should also be noted that although the measurement system 100 is described herein as being a signal analyzer, the inventive principles and concepts are not limited to being used with signal analyzers, but can be used with any suitable measurement system including, for example, radar receivers and spectrum monitoring receivers.

An input RF signal to be measured is received at an input port 101 of the measurement system 100 and is attenuated by an attenuator 102 and provided to a first input port of a mixer 103. A second input port of the mixer 103 receives a local oscillator (LO) RF signal of a predetermined frequency from an LO of a swept frequency generator 104. The LO RF signal is swept through a predetermined frequency range. The mixer 103 mixes the input RF signal with the LO RF signal and produces an intermediate frequency (IF) signal at an output port of the mixer 103. The IF signal is amplified to a predetermined level by an amplifier 106 of IF circuitry 105 and output to a gain compensation (GC) block 107 that compensates for frequency-dependent losses in the front end of the measurement system 100, i.e., before the output of the mixer 103. The gain-compensated IF signal is then inputted to an input of a resolution bandwidth (RBW) filter 108, which sets the resolution bandwidth of the measurement system 100. A detector 109 converts the signal outputted from the RBW filter 108 into a baseband signal representing the envelope of the IF signal. A video bandwidth (VBW) filter 112 smooths (i.e., averages) the detected envelope of the IF signal.

The display detector 113 performs processing, sometimes referred to as resampling, that creates trace elements at a desired spacing in time or frequency. The display detector 113 can be various types of display detectors, including, for example, an average detector and a peak detector. If the display detector 113 is an average detector, it can perform the aforementioned averaging of each of the trace elements over time during the duration of each respective trace element. This averaging reduces variance and reduces the aforementioned bias. Additionally, a separate trace average component 114 may be also used for this purpose. The scale conversion and inverse scale conversion blocks 111 and 115, respectively, allow the averaging processes performed by components 112-114 to occur on power, voltage or logarithmic (decibel) scales, which have varying advantages that are known in the art. The alignment and calibrations block 116 sets the gain of the GC block 107.

Figure 2:
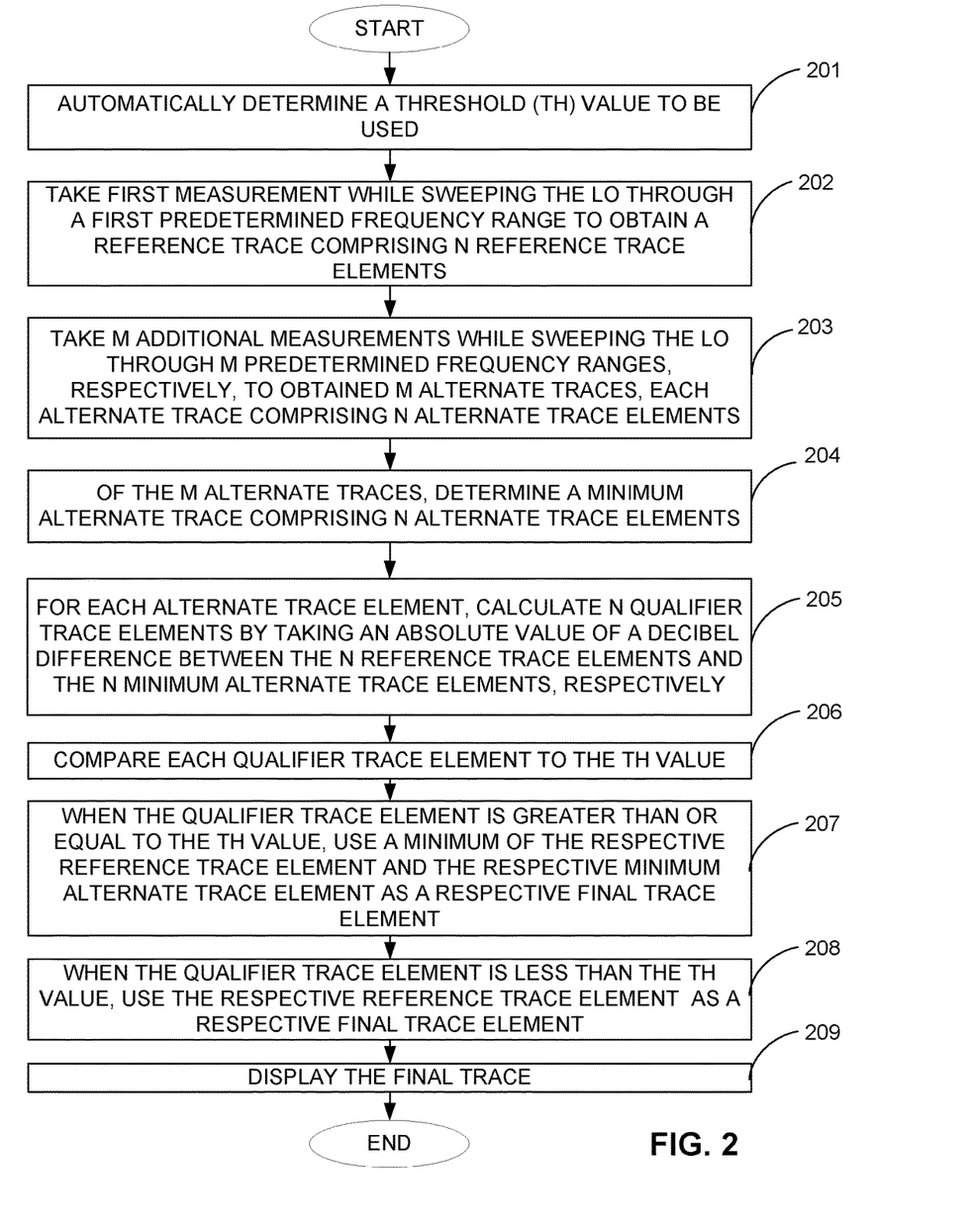
FIG. 2 illustrates a flow diagram that represents the preselection process performed by the processor shown in FIG. 1 to remove one or more of images and spurs from an intended RF signal being measured in accordance with a representative embodiment.

FIG. 2 illustrates a flow diagram that represents the preselection process performed by the processor 120 shown in FIG. 1 to remove one or more of images and spurs from an intended RF signal being measured in accordance with a representative embodiment. In accordance with this embodiment, a TH value to be used in the preselection process is determined at the commencement of the process, as indicated by block 201. The automatic determination of the TH value can be based on one or more of a plurality of factors. Representative embodiments for automatically determining the TH value are described below in more detail. As an example, the automatic determination of the TH value may be based on the state of the measurement system 100 (e.g., signal analyzer), in which case the TH value may be computed for the current state when the preselection algorithm is enabled and then recomputed when the state of the measurement system 100 changes.

At block 202, a first measurement of the input RF signal received at the input port 101 of the measurement instrument 100 is taken while sweeping LO of the swept frequency generator 104 through a first predetermined frequency range that is subdivided into N frequency increments, or buckets, to obtain a reference trace comprising N reference trace elements, respectively, where N is a positive integer that is greater than or equal to one. At block 203, M additional measurements of the input RF signal are taken while sweeping the LO through M predetermined frequency ranges, respectively, to obtain M alternate traces, respectively, where M is a positive integer that is greater than or equal to one. Each of the M frequency ranges is subdivided into N frequency increments, or buckets. Each of the M alternate traces comprises N alternate trace elements.

Of the M alternate traces, a minimum alternate trace comprising N minimum alternate trace elements is determined, as indicated by block 204. For each of the N minimum alternate trace elements, N qualifier trace elements are calculated by taking an absolute value of a decibel difference between the N reference trace elements and the N minimum alternate trace elements, respectively, as indicated by block 205. The N qualifier trace elements comprise a qualifier trace. At block 206, each qualifier trace element is compared to the TH value. When the qualifier trace element is greater than or equal to the TH value, a minimum of the respective reference trace element and the respective minimum alternate trace element is used as a respective final trace element of a final trace comprising N final trace elements, as indicated by block 207. When the qualifier trace element is less than the TH value, the respective reference trace element is used as the respective final trace element in the final trace, as indicated by block 208. The final trace is then displayed on the display device 140, as indicated by block 209.

Persons of skill in the art will understand the manner in which the LO sweeps are performed in blocks 202 and 203 and the manner in which the frequency of the LO is adjusted to perform the sweeps. For example, as will be understood by persons of skill in the art, after performing the low-side sweep, the LO is typically increased by 2 W to perform the high-side sweep to obtain the first alternate trace, i.e., the M=1 sweep, although there are different techniques for determining the proper amount by which to change the LO frequency range when performing additional sweeps to obtain additional alternate traces, without departing from the scope of the present teachings. In particular, persons of skill in the performing preselection will understand the manner in which this is done.

The processor 120 comprises one or more processors (not shown) or processing cores (not shown) configured to execute computer instructions, or code, in the form of software and/or firmware to perform the preselection algorithm described above with reference to FIG. 2. These instructions are stored in memory device 130 or in one or more other memory devices that are not shown. For example, processor 120 may be implemented by a computer processor, field-programmable gate arrays (FPGAs), application specific integrated circuits (ASICs), or combinations thereof, using software, firmware, hard-wired logic circuits, or combinations thereof. A computer processor, in particular, may be constructed of any combination of hardware, firmware or software architectures, and may include its own memory or memory device (e.g., nonvolatile memory) for storing executable software/firmware executable code that allows it to perform the various functions. In an embodiment, the computer processor may comprise a central processing unit (CPU), for example, executing an operating system. The memory devices constitute non-transient computer-readable mediums. A variety of non-transient computer-readable mediums are suitable for use with the invention, including, for example, solid state storage devices, magnetic storage devices and optical storage devices. For example, the memory devices may be implemented by any number, type and combination of random access memory (RAM) and/or read-only memory (ROM), which may include any number, type and combination of computer readable storage media, such as a disk drive, an electrically programmable read-only memory (EPROM), an electrically erasable and programmable read only memory (EEPROM), a CD, a DVD, a universal serial bus (USB) drive, and the like, which are non-transitory (e.g., as compared to transitory propagating signals).

Figure 3A:
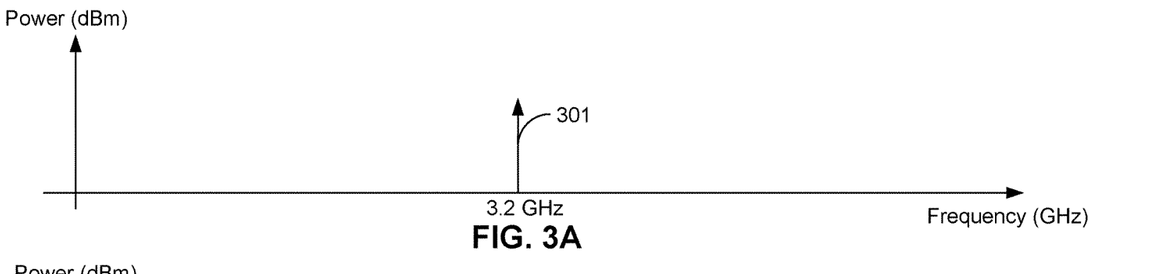
FIGS. 3A-3C illustrate power-versus-frequency graphs for an input RF signal being measured, a low-side mixing response and a high-side mixing response, respectively, for demonstrating an example of image removal, or rejection, performed by the measurement instrument shown in FIG. 1.
Figure 3B:
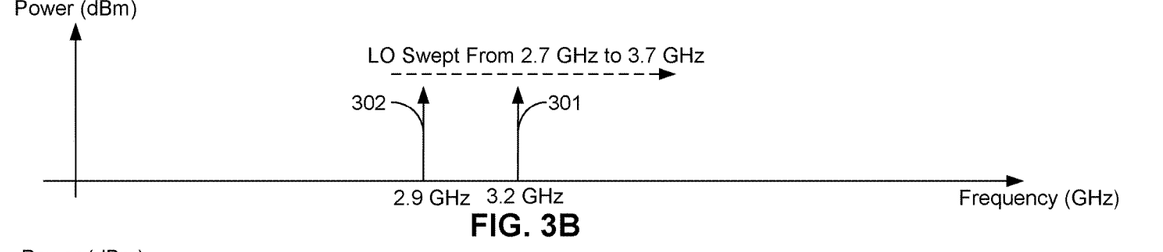
Figure 3C:
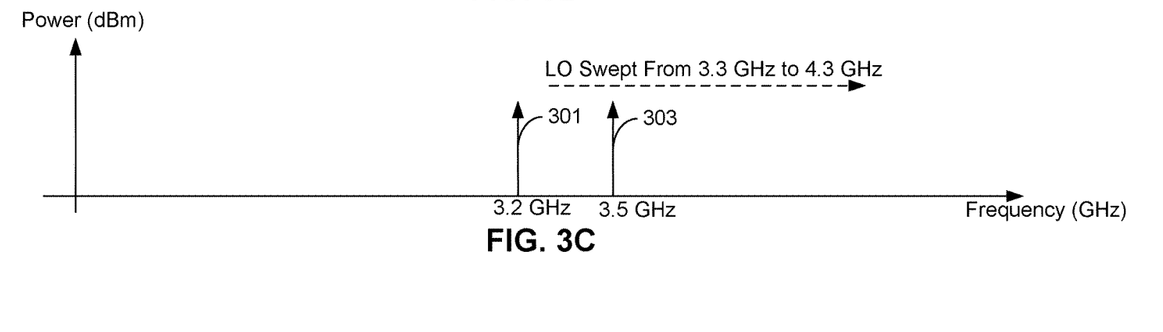

FIGS. 3A-3C illustrate power-versus-frequency graphs for an input RF signal being measured, a low-side mixing response and a high-side mixing response, respectively, that will be used to demonstrate an example of image removal, or rejection, performed by the measurement instrument 100 shown in FIG. 1. For this example, the following are assumed: the input RF signal 301 being measured is a 3.2 gigahertz (GHz) RF signal, as shown in FIG. 3A; the IF circuitry 105 is designed to respond to a 300 megahertz (MHz) IF signal; the LO sweeps through a frequency range of 2.7 GHz to 3.7 GHz during the low-side mixing; and that the LO sweeps through a frequency range of 3.3 GHz to 4.3 GHz during the high-side mixing.

During the low-side mixing, the IF circuitry 105 will detect a response when the LO is swept to 2.9 GHz, as shown in FIG. 3B. This result is given by the equation $F_{IF}=F_{RF}-F_{LO}$ for the low-side mix, which, as applied to this example, corresponds to 300 MHz=3.2 GHz-2.9 GHz. During the high-side mixing, the IF circuitry 105 will detect a response when the LO is swept to 3.5 GHz, as shown in FIG. 3C. This result is given by the equation $F_{IF}=F_{LO}-F_{RF}$ for the high-side mix, which, as applied to this example, corresponds to 300 MHz=3.5 GHz-3.2 GHz. Thus, FIG. 3B illustrates the real response obtained at 3.2 GHz whereas FIG. 3C illustrates the false response, i.e., the image, obtained at 3.5 GHz. If the final image is displayed on the display device 140 with the results shown in FIGS. 3B and 3C being produced by the IF circuitry 105, i.e., without performing the preselection algorithm, the final displayed image would not be accurate.

Figure 4:
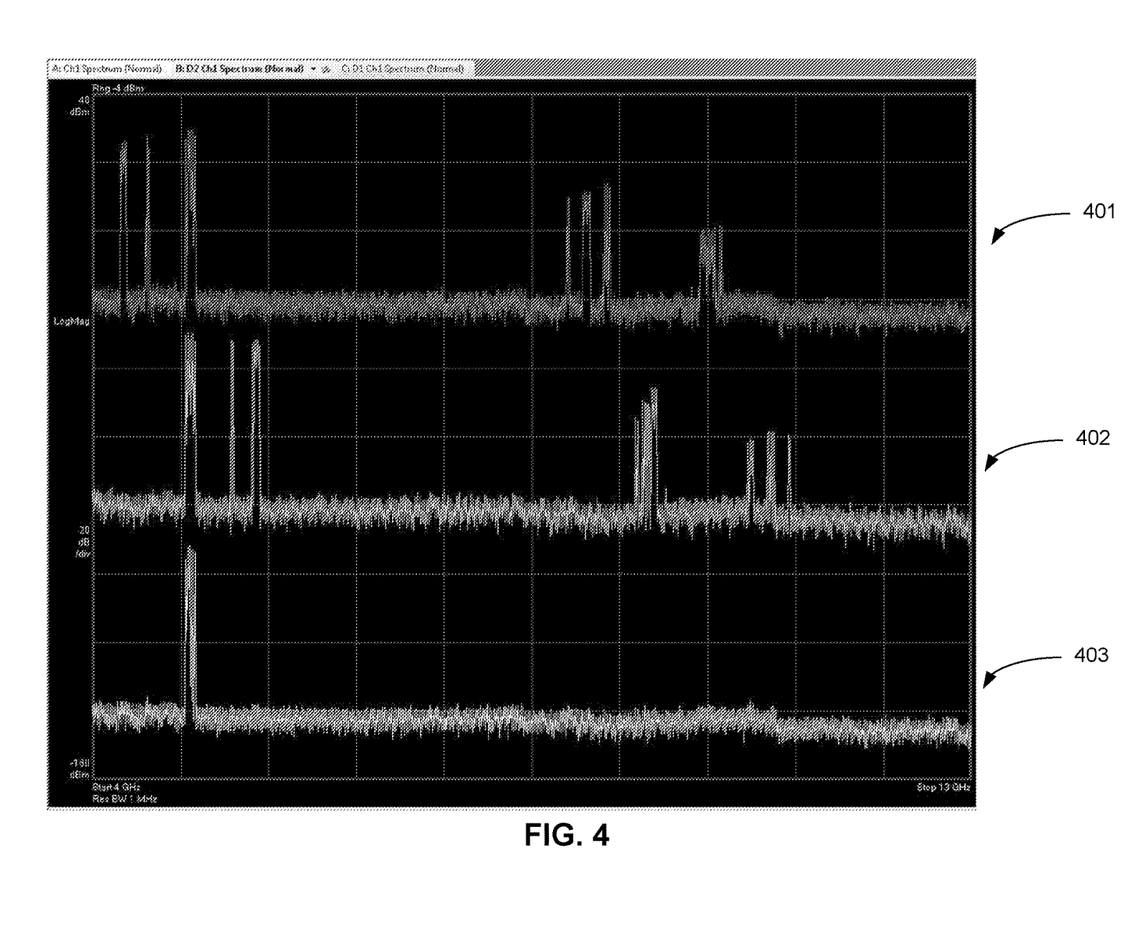
FIG. 4 illustrates an example of three traces displayed on the display device shown in FIG. 1, the top trace representing low-side mixing of a swept LO with an input RF signal, the middle trace representing high-side mixing of a swept LO with the same input RF signal, and the bottom trace representing the final RF signal after the preselection algorithm has been performed in accordance with a representative embodiment.

FIG. 4 illustrates an example of three traces displayed on the display device 140, the top trace 401 representing low-side mixing of a swept LO with an input RF signal, the middle trace 402 representing high-side mixing of a swept LO with the same input RF signal, and the bottom trace 403 representing the final RF signal after the preselection algorithm has been performed. Both of the traces 401 and 402 contain the real response and images. The trace 403 contains only the real response. The final trace 403 is obtained by removing any responses that are not common to both of the traces 401 and 402. With known preselection algorithms, the process of removing the images is generally performed by comparing, at each frequency bin, the values comprising the traces 401 and 402 and using the minimum value as the final value for the respective frequency bin. However, as indicated above, using the minimum values introduces a negative bias in the final trace for cases where the input RF signal being measured is a noise-like signal. The known solution for eliminating the bias, which has the drawbacks described above, compares the minimum values of the reference trace and the alternate trace at each point, or frequency bin, to a user-selected TH value. If the minimum value is above the TH value, then the minimum value is used in the final trace that is displayed; otherwise the reference trace value is used in the final trace.

In accordance with the inventive principles and concepts, the preselection algorithm performed by the processor 120 automatically determines the TH value based on one or more of a plurality of factors, as will now be described, to ensure that a proper TH value is always used when performing the preselection process. The selection of the TH value is important to the success of the preselection algorithm. As indicated above, if the TH value is set too high, images are not rejected, whereas if it is set too low, noise-like signals are biased negatively, on average, to an undesirable extent.

In accordance with a representative embodiment, the TH value is selected based at least in part on the risk of noise bias and the extent to which the reference trace is above the noise floor of the measurement instrument 100. The standard deviation of the error in the reference trace is assumed to be the same as that in the alternate traces. This is not strictly true because the alternate trace can have a bias and a lower standard deviation than those of the reference trace when it is created from the minimum of M traces where M>1, but the effect of this is minor.

The standard deviation of the reference trace, σtrace, is attributable to three factors, namely, (1) the state of the measurement system 100, (2) the relative accuracy of the calibration of the gain versus frequency in different configurations of the measurement system 100, and (3) the signal-to-noise ratio (SNR) of the power of the reference trace to the power of the predicted noise floor of the measurement system 100. Factor (1), the state of the measurement system 100, such as the state of the display detector 113 and the state of the VBW filter 112, for example, results in a standard deviation of the reference trace σtrace that can be estimated as:

$$\sigma\text{trace} = \frac{4.4\text{ dB}}{\sqrt{1+\frac{0.53*RBW*(Nbuckets-1)}{SweepTime}}},$$

where RBW is the resolution bandwidth of the measurement system 100, Nbuckets is the number, N, of frequency increments referred to above with reference to FIG. 2 that each swept frequency range is subdivided into, and SweepTime is a time period duration of a sweep of the LO between centers of adjacent frequency increments of the N increments of the first predetermined frequency range. Factor (2), the accuracy of the calibration of the gain-versus-frequency characteristics of the measurement system in different configurations of the measurement system 100, results in a standard deviation estimate that ranges from about 0.03 dB rms to about 2.0 dB rms, but often can safely be estimated to be about 0.2 dB rms. The standard deviation estimate that results from factor (2) is typically obtained using knowledge of processes that were used to manufacture, align and calibrate the measurement system 100. With respect to factor (3), the standard deviation due to SNR of the power of the reference trace to the power of the predicted noise floor of the measurement system 100, can be estimated as $10^{((-1/20)*(SNR-3))}$.

The standard deviation estimates due to factors (1)-(3) obtained in this manner are then used to compute $\sigma\text{trace}_{Final}$, which is then used to compute the TH value. Although typically all three standard deviation estimates are used to compute $\sigma\text{trace}_{Final}$, in some cases fewer than all three of the standard deviation estimates are used to compute $\sigma\text{trace}_{Final}$. A simple way to use the standard deviation estimates is to use them to perform a root-sum-square computation. Another way to use the standard deviation estimates is to take the root-sum-square of the standard deviation from a flatness calibration contributor using the larger of the other two standard deviation estimates. Once the standard deviation estimates have been obtained and used to compute $\sigma\text{trace}_{Final}$, the TH value that is used in steps 206-208 of FIG. 2 can be calculated as: $k*\text{sqrt}(2)*\sigma_{trace}$, where k is a constant having a value that is typically equal to 3. Using k=3 is a statistical common practice that leads to about a 0.15% probability of a false identification resulting in a pick of an image or spur as a minimum, as will be described below in more detail. The sqrt(2) is used because the difference between two traces is being evaluated.

Computing the TH value in this manner sets the probability of a false identification of a minimum as an image or spur as the probability that a Gaussian process exceeds the range ±3σ, which occurs with a 0.3% probability. When such an event occurs, the measurement results are negatively biased compared to the unbiased statistics of the reference trace. However, even half of the false identifications ultimately result in the reference trace being selected as the minimum anyhow, so it is only the single-sided probability that causes bias. Therefore, there is only a 0.15% probability of a false identification resulting in a pick of an image or spur as a minimum. When this occurs, most of the time the difference is only a little larger than 3*sqrt(2)*σtrace, or about 4.5*σtrace. At this probability, the bias is the product of 0.15% and 4.5*σtrace, or 0.007*σtrace, which is a more-than-acceptable bias. It should be noted that the bias of trace elements is very small because the trace elements are, ideally, heavily averaged by the display detector 113, or by some further averaging process, such as the Band Power Marker, or its equivalent in Channel Power or ACP functions, as will be understood by those of skill in the art. These processes are rarely more than 200 buckets wide, which would reduce the σ by a factor of 14:1, thus 0.07 times σ. A bias that is a factor of ten smaller than the standard deviation of the result is considered negligible, and thus for all intents and purposes, the bias is considered eliminated. A manually-selected TH value cannot consistently achieve such results without setting it to such a small value that images and spurs fail to be rejected.

Figure 5:
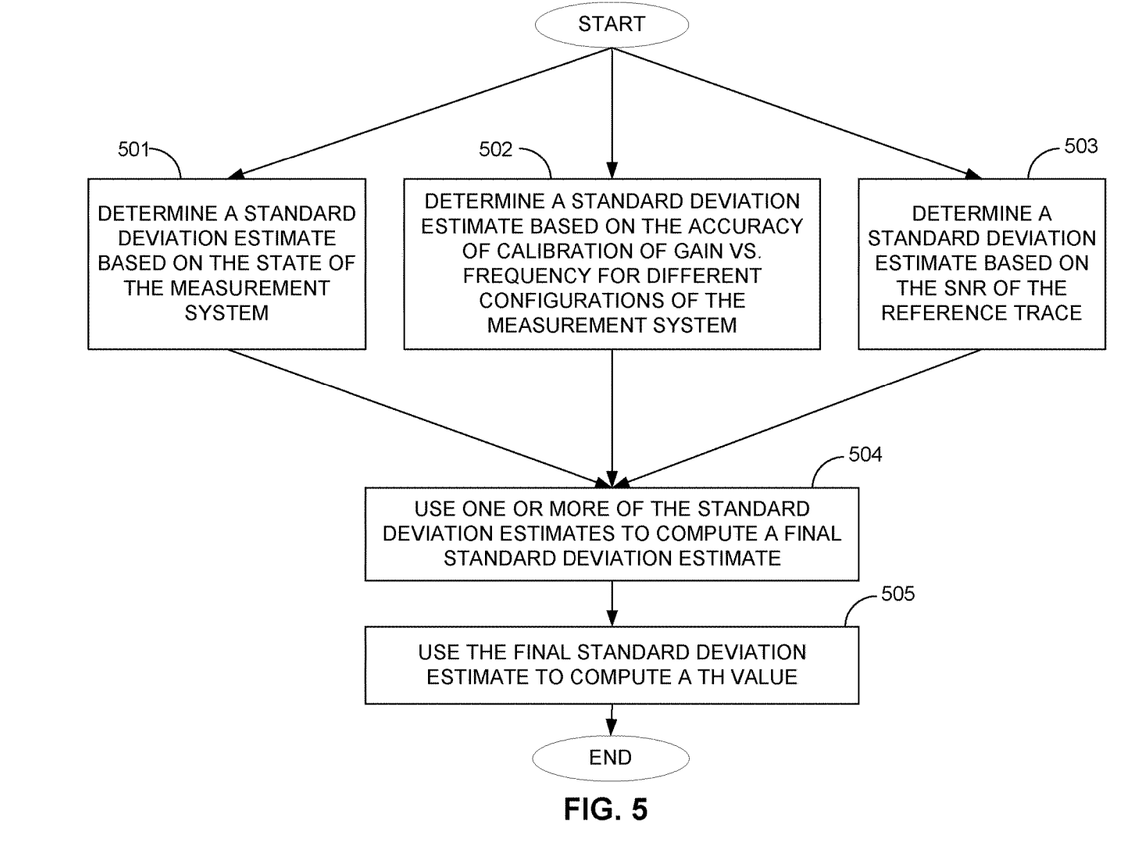
FIG. 5 illustrates a flow diagram that represents determination of TH value indicated by block 201 of FIG. 2 in accordance with a representative embodiment.

FIG. 5 is a flow diagram illustrating the process represented by block 201 in FIG. 2 for computing the TH value based on the final standard deviation estimate, $\sigma\text{trace}_{Final}$. Block 501 represents the process of determining a standard deviation estimate of the reference trace based on the state of the measurement system 100. Block 502 represents the process of determining a standard deviation estimate of the reference trace based on the accuracy of calibration of gain versus frequency characteristics of the measurement system 100 for different configurations of the measurement system 100. Block 503 represents the process of determining a standard deviation estimate of the reference trace based on the SNR of the power of the reference trace to the power of the predicted noise floor of the measurement system 100. Block 504 represents the process of using one or more of the standard deviation estimates determined at blocks 501-503 to compute the final standard deviation estimate, $\sigma\text{trace}_{Final}$. Block 505 represents the process of using $\sigma\text{trace}_{Final}$ to compute the TH value.

While the invention has been illustrated and described in detail in the drawings and foregoing description, such illustration and description are to be considered illustrative or exemplary and not restrictive. The invention is not limited to the disclosed embodiments. For example, a variety of modifications may be made to the measurement system 100 shown in FIG. 1 while still achieving the inventive principles and goals, as will be understood by those of skill in the art in view of the description provided herein. Likewise, a variety of modifications may be made to the process depicted in FIG. 1 while still achieving the inventive principles and goals, as will be understood by those of skill in the art in view of the description provided herein. For example, the order of the blocks shown in FIG. 2 can be changed. Other variations to the disclosed embodiments can be understood and effected by those skilled in the art in practicing the claimed invention, from a study of the drawings, the disclosure, and the appended claims.

What is claimed is:

1. A method for removing one or both of images and spurs from an intended radio frequency (RF) signal being measured, the method comprising:

in a measurement system, automatically determining a threshold (TH) value;

taking a first measurement of an input RF signal received at an input port of the measurement system while sweeping a local oscillator (LO) of the measurement system through a first predetermined frequency range subdivided into N frequency increments to obtain a reference trace comprising N reference trace elements, respectively, where N is a positive integer that is greater than or equal to one;

taking M additional measurements of the input RF signal while sweeping the LO of the measurement system through M predetermined frequency ranges, respectively, to obtain M alternate traces, respectively, where M is a positive integer that is greater than or equal to one, each of the M predetermined frequency ranges being subdivided into N frequency increments, each of the M alternate traces comprising N alternate trace elements;

of the M alternate traces, determining a minimum alternate trace, the minimum alternate trace comprising N minimum alternate trace elements;

for each of the N minimum alternate trace elements, calculating N qualifier trace elements by taking an absolute value of a decibel difference between the N reference trace elements and the N minimum alternate trace elements, respectively, the N qualifier trace elements comprising a qualifier trace;

comparing each qualifier trace element to the TH value, and when the qualifier trace element is greater than or equal to the TH value, using a minimum of the respective reference trace element and the respective minimum alternate trace element as a respective final trace element of a final trace comprising N final trace elements, and when the qualifier trace element is less than the TH value, using the respective reference trace element as the respective final trace element in the final trace; and displaying the final trace.

2. The method of claim 1, wherein the TH value is automatically determined based at least in part on a risk of noise bias in the intended RF signal and a risk that an image will fail to be removed from the intended RF signal.

3. The method of claim 1, wherein the TH value is automatically determined based at least in part on a risk of noise bias in the intended RF signal and an amount that the intended RF signal is above a noise floor of the measurement system.

4. The method of claim 1, wherein the TH value is automatically determined based at least in part on a standard deviation estimated in the final trace assuming the final trace has statistical variations that are similar to statistical variations of a noise-like signal.

5. The method of claim 4, wherein the TH value is automatically determined based at least in part on a standard deviation of the reference trace elements that is estimated using a state of the measurement system.

6. The method of claim 1, wherein the TH value is automatically determined based at least in part on a standard deviation of the reference trace elements that is estimated based on knowledge of processes that were used to manufacture, align and calibrate the measurement system.

7. The method of claim 6, wherein the standard deviation is estimated to be in a range of about 0.03 root mean square decibels (dB rms) to about 2.0 dB RMS.

8. The method of claim 1, wherein the TH value is automatically determined based at least in part on a standard deviation of the reference trace elements that is estimated based at least in part on a signal-to-noise ratio (SNR) of a power of the reference trace to a power of a predicted noise floor of the measurement system.

9. The method of claim 1, wherein the TH value is automatically determined based at least in part on a standard deviation of the reference trace elements estimated based, at least in part, on a resolution bandwidth (RBW) of the measurement system, N, and a sweep time equal to a time period duration for a sweep of the LO between centers of adjacent frequency increments of the N frequency increments of the first predetermined frequency range.

10. A measurement system that removes one or both of images and spurs from a signal being measured, the measurement system comprising:
   memory; and
   a processor that processes a reference trace and M alternate traces to remove an image from an intended radio frequency (RF) signal, the reference trace comprising N reference trace elements, each alternate trace comprising N alternate trace elements, where M is a positive integer that is greater than or equal to one and N is a positive integer that is greater than or equal to one, the processor comprising:
   logic configured to automatically determine a threshold (TH) value;
   logic configured to obtain the reference trace by taking a first measurement of an input RF signal received at an input port of the measurement system while sweeping a local oscillator (LO) of the measurement system through a first predetermined frequency range subdivided into N frequency increments;
   logic configured to obtain the M alternate traces by taking M additional measurements of the input RF signal while sweeping the LO of the measurement system through M predetermined frequency ranges, respectively, wherein each of the M predetermined frequency ranges is subdivided into N frequency increments;
   logic configured to, for the M predetermined frequency ranges, determine a minimum alternate trace comprising N minimum alternate trace elements;
   logic configured to, for each of the N minimum alternate trace elements, calculate N qualifier trace elements by taking an absolute value of a decibel difference between the N reference trace elements and the N minimum alternate trace elements, respectively, the N qualifier trace elements comprising a qualifier trace;
   logic configured to compare each qualifier trace element to the TH value;
   logic configured to, for each comparison, when the qualifier trace element is greater than or equal to the TH value, use a minimum of the respective reference trace element and the respective minimum alternate trace element as a respective final trace element of N final trace elements that comprise a final trace, and when the respective qualifier trace element is less than the TH value, use the respective reference trace element as the respective final trace element of the N final trace elements comprising the final trace; and
   logic configured to cause the final trace to be displayed on a display device of the measurement system.

11. The measurement system of claim 10, wherein the TH value is automatically determined based at least in part on a risk of noise bias in the intended RF signal and a risk that the image will fail to be removed from the intended RF signal.

12. The measurement system of claim 10, wherein the TH value is automatically determined based at least in part on a risk of noise bias in the intended RF signal and an amount that the intended RF signal is above a noise floor of the measurement system.

13. The measurement system of claim 10, wherein the TH value is automatically determined based at least in part on a standard deviation estimated to be in the final trace assuming the final trace has statistical variations that are similar to statistical variations of a noise-like signal.

14. The measurement system of claim 13, wherein the TH value is automatically determined based at least in part on a standard deviation of the reference trace elements that is estimated using a state of the measurement system.

15. The measurement system of claim 10, wherein the TH value is automatically determined based at least in part on a standard deviation of the reference trace elements that is estimated based on knowledge of processes that were used to manufacture and calibrate the measurement system.

16. The measurement system of claim 15, wherein the standard deviation is estimated to be in a range of about 0.03 root mean square decibels (dB rms) to about 2.0 dB rms.

17. The measurement system of claim 10, wherein the TH value is automatically determined based at least in part on a standard deviation of the reference trace elements that is estimated based at least in part on a signal-to-noise ratio (SNR) of a power of the reference trace to a power of a predicted noise floor of the measurement system.

18. The measurement system of claim 10, wherein the TH value is automatically determined based at least in part on the standard deviation of the reference trace elements estimated based, at least in part, on a resolution bandwidth of the measurement system, N, and a sweep time equal to a time period duration for a sweep of the LO between centers of adjacent frequency increments of the N frequency increments of the first predetermined frequency range.

19. A non-transitory computer readable medium storing code that, when executed by a computer processor, processes a reference trace and M alternate traces to produce a final trace with one or both of images and spurs removed, the reference trace comprising N reference trace elements obtained by taking a first measurement of an input RF signal received at an input port of a measurement system while sweeping a local oscillator (LO) of the measurement system through a first predetermined frequency range subdivided into N frequency increments, each of the M alternate traces comprising N alternate trace elements, the M alternate traces being obtained by taking M additional measurements of the input RF signal while sweeping the LO of the measurement system through M predetermined frequency ranges, respectively, each of the M predetermined frequency ranges being subdivided into N frequency increments, where M and N are positive integers that are greater than or equal to one the non-transitory computer readable medium comprising:

a first code segment for determining a threshold (TH) value;

a second code segment for determining, for each of the M predetermined frequency ranges, a respective minimum alternate trace, each minimum alternate trace comprising N minimum alternate trace elements;

a third code segment for calculating, for each of the N minimum alternate trace elements, a qualifier trace element that is an absolute value of a decibel difference between a respective reference trace element and a respective minimum alternate trace element;

a fourth code segment for comparing each qualifier trace element to the TH value;

a fifth code segment for selecting a minimum of the respective reference trace element and the respective minimum alternate trace element to be used as a respective final trace element of a final trace when the respective qualifier trace element is greater than or equal to the TH value, the final trace comprising N final trace elements;

a sixth code segment for selecting the respective reference trace element to be used in the final trace if the respective qualifier trace element is not greater than or equal to the TH value; and a seventh code segment for causing the final trace to be displayed on a display device of the measurement system.

\* \* \* \* \*